Dec. 28, 1937.　　　　　R. F. BEAN　　　　　2,103,928
MIXING DEVICE
Filed July 31, 1935　　　　3 Sheets-Sheet 1

Inventor:
Robert F. Bean,
by Harry E. Dunham
His Attorney.

Dec. 28, 1937.  R. F. BEAN  2,103,928
MIXING DEVICE
Filed July 31, 1935  3 Sheets-Sheet 2
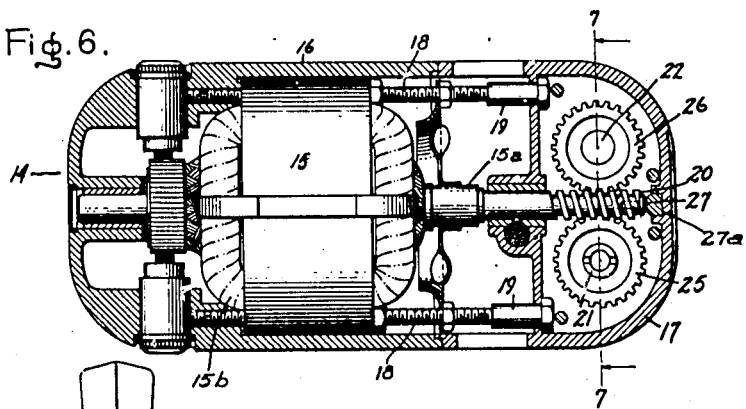
Inventor:
Robert F. Bean,
by Harry E. Dunham
His Attorney.

Dec. 28, 1937.     R. F. BEAN     2,103,928
MIXING DEVICE
Filed July 31, 1935     3 Sheets-Sheet 3

Inventor:
Robert F. Bean,
by Harry E. Dunham
His Attorney.

Patented Dec. 28, 1937

2,103,928

UNITED STATES PATENT OFFICE 2,103,928

MIXING DEVICE

Robert F. Bean, Bridgeport, Conn., assignor to General Electric Company, a corporation of New York Application July 31, 1935, Serial No. 34,010

13 Claims. (Cl. 259—84)

This invention relates to mixing devices, more particularly to power driven devices for mixing batters, beating eggs, whipping cream, extracting juice, etc., and it has for its object the provision of an improved device of this character.

More specifically, this invention relates to a mixing device that is provided with a supporting base, but which can be removed from the base for operation in other locations, such as in a utensil that is being heated on a range.

In accordance with this invention, the mixing device in one form thereof, comprises a combination motor and gear unit, preferably arranged so that the motor will be supported in a horizontal position with the gear unit at one end thereof. The gear unit is arranged to support a beater or agitator unit beneath it and a juice extracting device above it, and to connect these devices with the motor.

A suitable base or standard is provided for the gear and motor unit. Mounted on the standard is a support which slidably receives the unit and supports it in its working position on the standard. The support has a pivotal connection with the standard so that the unit can be swung upwardly from its working position to provide for manipulation of the beater in and out of the mixing bowl associated with it, and also, so that the unit can be conveniently applied to and removed from its support. Suitable locking means are provided for preventing movement of the unit relative to its support when the unit is in its working position on the standard.

A handle is attached to the unit, whereby it can be conveniently manipulated when removed from the standard. The handle is arranged to be retracted from its working position to provide space on top of the unit for the juice extracting device, and latching means are provided for locking the handle in both its working and retracted positions.

Figure 1:
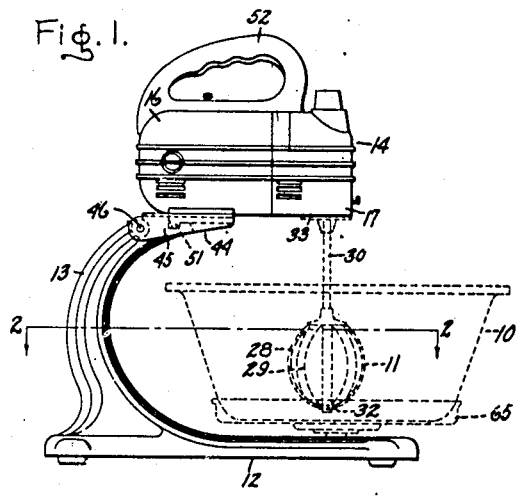
Figure 3:
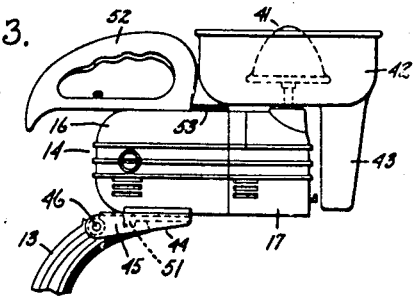
Figure 2:
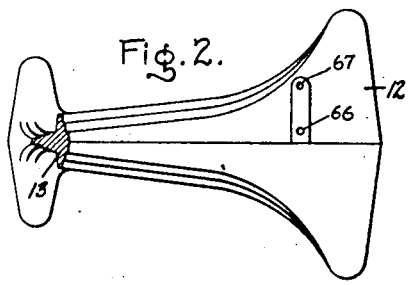
Figure 4:
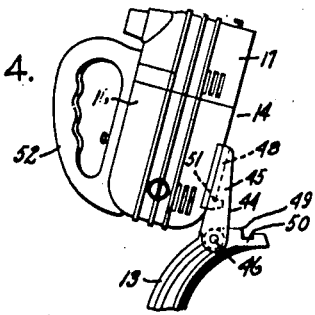
Figures 5, 9:
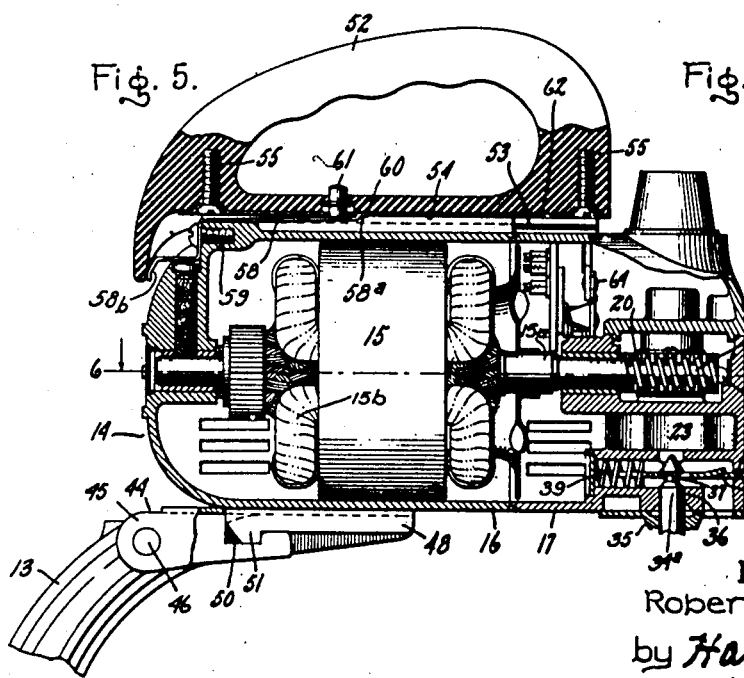
Figure 12:
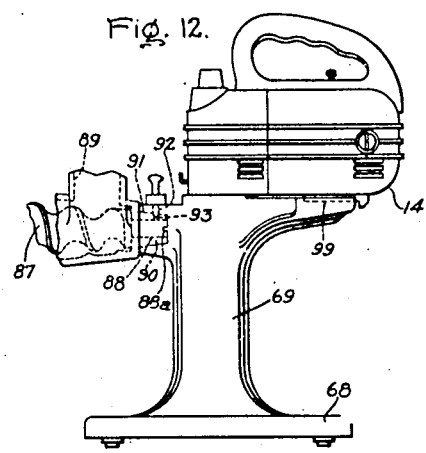
Figure 13:
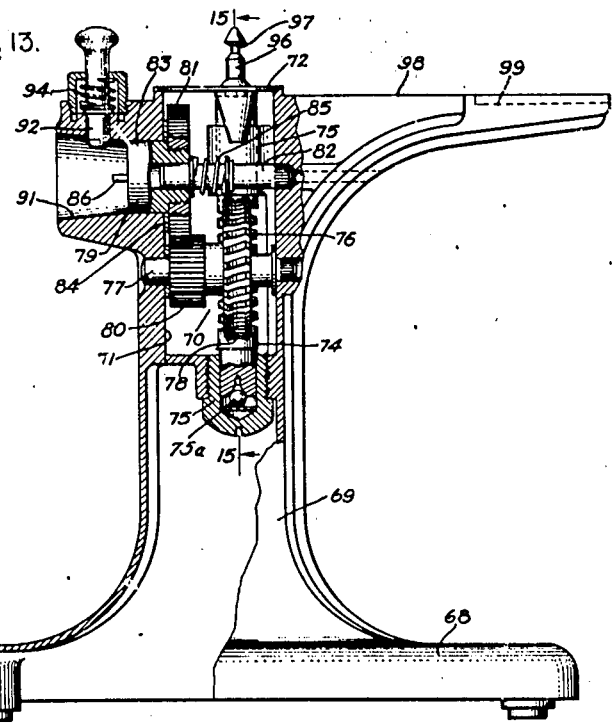
Figure 15:
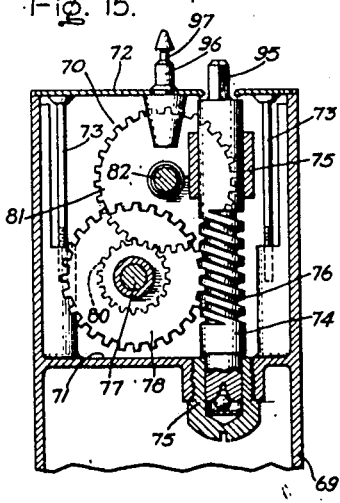
Figure 14:
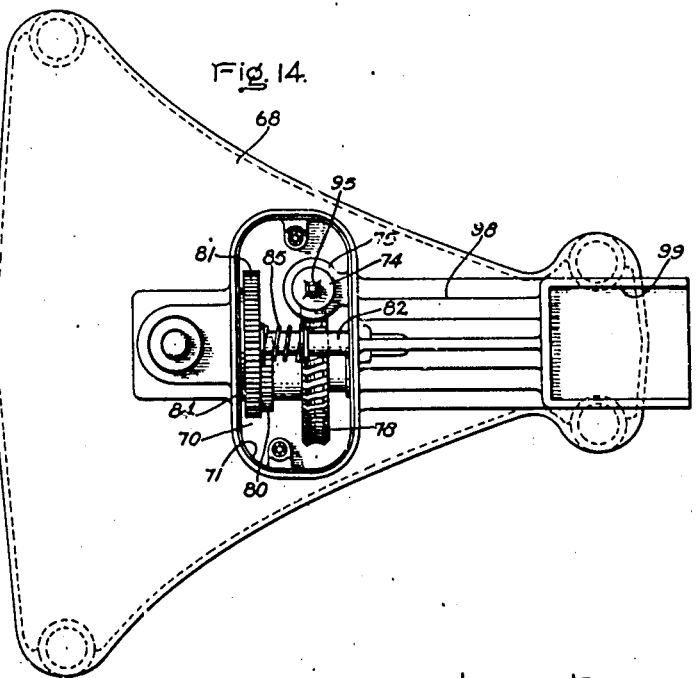

For a more complete understanding of this invention, reference should be had to the accompanying drawings in which Fig. 1 is a side elevation of a mixing device embodying this invention; Fig. 2 is a sectional view taken through the line 2—2 of Fig. 1, portions being eliminated so as to illustrate certain details of construction; Fig. 3 is a fragmentary view illustrating a portion of the mixing device of Fig. 1, but in a different operative condition than shown in Fig. 1; Fig. 4 is a view similar to Fig. 3, but illustrating the device in still another operating condition; Fig. 5 is an enlarged vertical central sectional view taken through a portion of the mixing device shown in Fig. 1; Fig. 6 is a horizontal sectional view taken through the line 6—6 of Fig. 5 and looking in the direction of the arrows; Fig. 7 is a vertical sectional view taken through the line 7—7 of Fig. 6 and looking in the direction of the arrows; Fig. 8 is a fragmentary perspective view of a portion of the mixing device; Fig. 9 is an elevation of a beater unit used with the mixing device; Fig. 10 is an expanded perspective view illustrating certain elements of a locking mechanism used with the handle of the mixing device and arranged in accordance with this invention; Fig. 11 is a diagrammatic view illustrating the speed control system provided for the driving motor of the mixing device; Fig. 12 is an elevation of a power transmitting unit adapted to be operated by the power unit of this mixing device and intended to operate certain auxiliary appliances, such as a meat grinder; Fig. 13 is an enlarged elevation of a portion of the apparatus shown in Fig. 12, portions being shown in section so as to illustrate certain details of construction; Fig. 14 is a plan view of the apparatus shown in Fig. 13, parts being removed so as to illustrate certain details of construction; and Fig. 15 is a fragmentary sectional view taken through the line 15—15 of Fig. 13, and looking in the direction of the arrows.

Referring to the drawings, this invention is shown as applied to a mixing device comprising a food receptacle 10 in which a suitable agitator or beater element 11 is arranged to operate. The receptacle 10 and the agitator element 11 are mounted on a suitable frame which comprises a base 12 on which an upright standard 13 is mounted at one end thereof, the left hand end, as viewed in Figs. 1 and 2. The standard 13 preferably will be and as shown is formed integrally with the base 12.

The agitator or beating element 11 is driven by a combination motor and gear reduction unit 14. The unit 14 comprises an electric driving motor 15 mounted within a housing 16. Preferably, the motor will be so arranged that it will be supported in a horizontal position, that is, so that its driving shaft 15a will be horizontal when the motor is in its working position on the base 12, as shown in Figs. 1 and 5. Located at one end of the motor housing 16 is a gear casing 17; as shown, this gear casing is mounted on the right-hand end of the motor housing, as viewed in Figs. 1, 3, 4, and 5. The gear casing 17 is secured to the motor casing 16 by means of elongated screw fastening means 18 (Fig. 6) which at their inner ends are threaded into the motor casing 16, as shown in Fig. 6, and which at their outer ends receive elongated nuts 19 arranged when threaded on the screws 18 to rigidly secure the two casings together. The screws 18 also function to secure the motor 15 in its casing, as clearly shown in Fig. 6.

Mounted on the end of the motor driving shaft 15a is a worm 20 which, as shown, is located horizontally within the gear casing 17.

of beater driving shafts 21 and 22 are supported in a vertical position in the gear casing 17 by means of bearings 23 and 24, as clearly shown in Fig. 7. It will be observed that the bearings 23 and 24 support the shafts 21 and 22 in substantially parallel relation with each other, the two shafts being spaced apart cross-wise of the casing 17. The shafts 21 and 22 are provided with spur gears 25 and 26 secured to them and arranged to mesh with the worm gear 20 on the motor shaft. Preferably, a ball thrust bearing 27 will be interposed between the end of this shaft and the adjacent wall of the gear housing 17.

The agitator 11 is arranged to be secured to the gear casing 17 beneath it and when thus secured to have a driving connection with the shafts 21 and 22. The agitator or beater element 11 comprises a pair of beaters 28 and 29 mounted on suitable operating shafts 30 and 31. These beaters at their lower ends are rotatably mounted on a plate 32, while the upper ends of the shafts 30 and 31 are rotatably mounted in a plate 33. The plate 33 is rigidly secured to a supporting rod 34, which, as shown, is provided at its upper end with an abutment 35 on which the plate 33 rests and to which it is secured. The lower end of the rod 34 is curved outwardly as indicated at 35a to provide for the rotary motion of the beaters 28 and 29, and the lower end of the curved portion is rigidly secured to the plate 32.

The rod 34 is arranged to be rigidly secured to the gear casing, and for this purpose the upper end 34a of the rod above the plate 33 is arranged to be received in a suitable aperture 36 (Figs. 5 and 7) provided for it in the housing structure 17. This upper end of the rod 34 is provided with an annular groove 37 which is arranged to receive a latching or locking device 38 whereby the agitator is secured in its vertical operative position.

The latch 38, as shown, is of plate form and is mounted for longitudinal movement relative to the gear housing so that when the rod 34 is inserted, it can move into the annular channel 37 and thereby hold the rod in place. The latch is moved to its locking position with the rod by means of a compression spring 39. One end 38a of the latch protrudes from the casing so that it may be depressed inwardly against the force of the spring 39 to provide for the release of the agitator unit. The plate 38 is provided with an upwardly extending tongue 38b which is arranged to engage the front wall of the gear housing and thereby limit the forward movement of the latch.

The upper ends of the agitator rods 30 and 31 are provided with square portions 40, which are arranged to be received in similarly shaped sockets (not shown) provided for them in the lower ends of the beater rods 21 and 22 respectively.

It will be understood that the supporting rod 34 may be secured to the gear casing in the manner previously described when the shafts 30 and 31 are positioned so that the square ends 40 on shafts 30 and 31 can be received in their respective sockets provided for them in the driving shafts.

The upper end of the driving shaft 22 in the gear casing terminates at the upper end of its spur gear 26, but the shaft 21 continues on upwardly and protrudes through the upper wall of the gear casing for the purpose of driving a juice extracting device. The juice extracting device comprises an extracting reamer 41 with which a juice collecting bowl 42 cooperates. As shown, the bowl 42 is provided with a depending discharge nozzle 43. It will be understood that the juice extracting reamer will be provided with a shaft that is provided with teeth at its lower end (not shown) arranged to be received in slots 43a provided for them in the upper end of shaft 21, whereby a driving connection is effected between the shaft and the reamer.

It will thus be observed that the power unit 10 comprises means for driving the agitator 11 in a vertical position beneath it and also the juice extracting device when positioned above it.

As pointed out previously, it is contemplated that the power unit may be utilized as a stationary device in cooperation with its base 12, 13 and also as a portable device when removed from the base in order that the device may be used in other locations, such as to beat or whip edibles being heated on a range. In accordance with this invention, suitable means are provided for mounting the power unit on the base so that it may be conveniently applied thereto and conveniently removed, but when it is applied, to have a rigid connection with the base so as to obviate any possibility of the power unit becoming detached while it is being operated. The power unit 16 is mounted on a supporting plate-like member 44, which is pivotally mounted on the upper end of the standard. As shown, the plate 44 is provided at its sides with depending flanges 45 which are pivotally mounted upon pins 46 that are secured to the opposite sides of the upper end of the standard 13. The flanges 45 at the sides project outwardly from the front of the plate 44 and on their upper edges are provided with inturned flanges 47 arranged at right angles to the depending portions 45. The flanges 47 are arranged to slidably receive the power unit.

For this purpose, the motor housing 16 is provided beneath it with an integral mass 48 in the sides of which are provided a pair of channels 48a which are arranged to slidably receive the flanges 47. In other words, the supporting plate 44 is provided with a pair of laterally spaced apart flanges which receive a pair of laterally spaced apart channels on the power unit. In order to apply the power unit to the supporting plate 44 it is merely necessary to elevate the plate, as shown in Figs. 4 and 8, and then slide the motor unit inwardly on the flanges 47.

The upper end of the standard is provided with a plain horizontal surface 49 which is arranged to engage and support the plate 44 when the plate 44 is moved into a horizontal position, as shown in Figs. 1, 3 and 5. In order to prevent accidental removal of the power unit when it is in its horizontal working position, as shown in these figures, suitable interlocking means are provided between the power unit and the standard. The interlocking means comprise a channel 50 provided in the standard at the front of the surface 49 and in a position substantially parallel to the axis of rotation of the power unit on the pins 46. The mass 48 is provided at the rear with a pair of depending lugs or flanges 51 which are so arranged that when the power unit is moved completely inwardly on its flanges, as shown in Figs. 1, 3, 5, and 8, and when it is moved to its horizontal position, as shown in Figs. 1, 3 and 5, they will be received by the channel 50 so as to prevent any longitudinal movement of the power unit relative to its supporting structure.

In order that the power unit may be conveniently manipulated when removed from its supporting standard, a suitable handle 52 is provided which is arranged above the power unit and which extends longitudinally thereof over the motor and gear casings 16 and 17, as shown in Figs. 1, 4, and 5. The handle has a sliding interlocking connection with the power unit. This interlocking connection comprises a pair of flanges 53 (Fig. 7) spaced apart laterally on top of the motor housing 16, and a plate 54 (Figs. 5, 7, and 10) secured to the under side of the handle by means of screw fastening means 55. The plate 54 is provided at its edges with downwardly extending flanges 56 which terminate in horizontally arranged flanges 57. The flange portions 56, 57 are arranged to be slidably received by the flanges 53 on the power unit so that all movement between the handle and power unit is prevented except a longitudinal movement of the handle relatively to the unit. Suitable latching means is provided for holding the handle in its operative position, shown in Figs. 1 and 5. The latching means, as shown, comprises a spring member 58 (Figs. 5 and 10), which is secured to the motor housing by means of screw fastening means 59, as shown in Fig. 5, so that it lies between the flanges 53 on the motor housing and the flanges 56, 57 on the handle. The latch 58 is formed of a resilient material, and is so arranged that it is biased upwardly by its inherent resiliency. The latching end 58a of the latch is elevated, as shown, and this end is arranged to be received in an aperture 60 provided for it in the plate 54 which is so positioned that when the handle is in its operative position, the end 58a of the latch will fit in the aperture to lock the handle. The latch is released to provide for longitudinal movement of the handle with reference to the power unit by means of a suitable push button 61. The secured end 58b of the latch bears against the handle, as shown in Fig. 5, to eliminate end movement of the handle due to slight variations in the parts that occur in manufacture.

The handle is made rather large, as shown, and extends practically across the entire power unit so as to provide a well balanced construction, whereby the unit can be held conveniently by the operator when used as a portable unit detached from its standard.

It is because of this arrangement of the handle 52 that it is mounted on the power unit so that it may be moved to a retracted position, as shown in Fig. 3 to provide space for the extractor unit 41, 42. In order to apply the extractor unit, it is necessary to depress the button 61 to release the handle whereby it can be moved to its retracted position. The latch 58, 58a also functions to hold the handle in its retracted position, and for this purpose, the plate 54 is provided with a second aperture 62 arranged to receive the latching end 58a when the handle is in the retracted position. The latch end 58a prevents further outward movement of the handle 52 when in its retracted position of Fig. 3. The latch, however, does not restrain motion of the handle to its normal operative position, the curvature between the two portions 58 and 58a of the latch providing for release of the latch merely by movement of the handle to the right.

The electric motor 15 may be any suitable electric motor; thus, it may be either an alternating current motor or a direct current motor, or it may be a motor adapted to operate on either alternating current or direct current. The motor preferably will be of the latter type, and is energized from a suitable source of electrical supply 63 (Fig. 11). The motor is controlled by means of a suitable multi-position switch 64 which is mounted within the housing 17 and which is provided with a controlling knob 65, accessible on the exterior of the casing. The details of construction of this switch form no part of the present invention and it has been deemed unnecessary to illustrate in detail its specific structure. It will be understood that any suitable switch may be used to control the motor. As shown in Fig. 11, the switch 64 controls the energization of the motor field 15b so that when the switch is in its position 64a, the motor will operate on maximum field and thereby operate at minimum speed; when in its position 64b, the motor will operate on reduced field and therefore will operate at increased speed; and when in its position 64c, the motor will be operating on minimum field strength and therefore at its maximum speed. In other words, three speeds are provided: known as "Low", "Medium" and "High" speeds.

It will be understood that the agitator unit may be operated in any suitable bowl 10. It is preferable, however, that the bowl 10 be supported on a suitable turn table 65 which is rotatably mounted in an aperture 66 provided for it in the base 12. If a larger sized bowl be used, it is preferable to support it in a second aperture 67 provided for it in the base spaced laterally of the aperture 66 so that the beating elements will be brought in the same relation with reference to the walls of the bowl as the elements have with the smaller bowl.

In Figs. 12–15 inclusive is shown a power transmitting unit adapted to drive auxiliary devices, such as a meat grinder, the source of power being the motor 15 of the power unit 14. As shown in these figures, the power transmitting unit comprises a base 68 which supports an upright standard 69. Within the upper end of the standard 69 is housed a suitable gear reduction mechanism 70. For this purpose, the standard is provided with a chamber 71 in its upper end. This chamber normally is closed by means of a suitable cover member 72, secured to the standard by means of suitable screw fastening means 73.

The gear reduction mechanism 70 comprises a vertical power input shaft 74 mounted in suitable spaced upper and lower bearings 75. The lower bearing supports a thrust bearing 75a. The upper bearing is integral with the standard, but the lower, as shown, is removable. This construction provides simple means of aligning and lubricating the worm shaft 74 and its worm 76. The shaft 74 is provided with a worm thread 76 intermediate its ends. The thread 76 functions to drive a shaft 77 through a worm wheel 78 mounted on the shaft and meshing with the worm 76. The shaft 77 in turn is arranged to drive a power take-off shaft 79; for this purpose, the shaft 77 drives a gear 80 which meshes with a gear 81 rigidly secured to the take-off shaft 79. The power take-off or output shaft 79 and the gear 81 are mounted to rotate freely on a horizontally disposed pin or stud 82 which is rigidly secured to the standard 69. As shown, the stud 82 is parallel to the shaft 77.

The shaft 79 is arranged to rotate in a bearing 83 provided for it in the standard, while the gear 81 rests against a suitable thrust bearing 84 provided for it about the bearing 83. The gear 81 is biased to its position against its bearing 84 by means of any suitable compression spring 85.

The outer end of the take-off shaft 79 constitutes a driving head, and in order to provide a driving connection with an auxiliary device, the head is provided with a transverse driving tooth 86.

The auxiliary device shown in Fig. 12 driven by the power transmission unit is a meat grinder, but it will be understood that other auxiliary appliances can be driven by the unit. The meat grinder, as shown, comprises feeding or forcing screw 87 which is driven by a shaft 88 rigidly attached to it, and also a hopper 89 through which the meat or other edible is supplied to the feed screw. The drive shaft 88 is mounted in a bearing member 90 provided for it on the grinder housing, which bearing member is adapted to be inserted in a socket 91 provided for it in the standard opposite the bearing 83 in which the shaft 79 is mounted.

The bearing 90 and hence the meat grinder to which it is attached are locked in operating position on the standard 69 by means of a suitable locking pin 92 which is received in an aperture 93 provided for it in the bearing 90. The pin 92 is biased to its locking position by means of a compression spring 94; to release the grinder, it is merely necessary to retract the pin from the aperture 93 against the force of the spring 94 and then withdraw the grinder as a unit from the socket 91.

The end of the shaft 88 is provided with a transverse slot 88a which is arranged to receive the tooth 86 on the shaft 79 and therefore effect a driving connection between these members.

The driving head 79 together with its gear 81 are mounted for limited longitudinal movement on the shaft 82 so that in the event the meat grinder is applied to the gear standard when the tooth 86 does not align with the slot 88a, the head and gear will be engaged by the end of the meat grinder shaft 88 and be moved backwardly into the gear housing on the shaft 82 against the bias of the spring 85. Thus, the grinder unit may be attached to the standard 69 and locked thereto by means of the pin 92 even though the driving tooth 86 is not received in the slot 88a. However, when the gear reduction mechanism is operated, the tooth 86 will eventually align itself with the slot 88a, whereupon the spring 85 will force the driving head 79 and gear 81 to their operating position shown in Fig. 13.

The vertical power input shaft 74 is provided at its upper end with a reduced portion 95 of square or other non-circular cross-section, but having a shape similar to the driving sockets in the lower ends of the shafts 21 and 22 of the power unit 14, and this end 95 is adapted to be received in driving relation with one of these sockets—the one in the shaft 21 in this case.

The gear reduction unit is provided with suitable means for securing the power unit 14 to it in its operative position, as shown in Fig. 12. For this purpose, the cover member 72 is provided on its upper surface with an upright locking stud 96 which is of similar form to the upper end of the rod 34 of the beater unit 11. Thus, it is provided with a reduced section 97 which is so arranged that when the power unit is applied to the standard, as shown in Fig. 12, it will be received in the aperture 36, and is so arranged that the latching member 38 will be received in the reduced section 97 to lock the power unit to the standard. It will be understood, of course, that the stud 96 will be so positioned relative to the drive shaft 74 that when the power unit is applied in its operative position, the shaft 21 will receive the upper end of the power input shaft 74 to effect a driving connection between the power unit and the gear reduction unit.

As shown, the upper end of the standard 69 supports a table 98 upon which the motor casing rests. This table is provided at its outer extremity with a recess 99 arranged to receive the metal mass 48, 51 provided on the bottom of the power unit.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A mixing device comprising a base, a support on said base, a motor-driven beater unit, means detachably mounting said beater unit on said support, means pivotally connecting said support to said base so that said beater unit can be swung from and returned to a working position, and locking means on said unit operative to engage a part of said base when said support is swung to carry the unit into its working position to prevent separation of said beater unit from said support.

2. A mixing device comprising a standard, a motor driven beater unit, a support slidably receiving said beater unit pivotally mounted on said standard so that said unit can be swung away from and returned to a working position and means on said standard engaging a part of said unit when said unit is swung on said support to said working position so as to prevent relatively sliding movement between said unit and said support.

3. A mixing device comprising a base, a standard on said base, a support on said standard, means pivotally mounting said support on said standard, flanges carried by said support, a beater driving motor mounted on said support having grooves that are slidably received by said flanges, means pivotally connecting said support to said standard whereby said motor and support can be swung as a unit to and from a working position on said standard, a handle attached to said motor and tongue and groove interlocking means between said motor and said standard moved into locking relation by movement of said motor and support to said working position to prevent relatively sliding movement between said motor and said support.

4. A mixing device comprising a base, a standard on said base, a beater unit including a motor and a beater element driven by said motor, a plate-like support for said beater unit on said standard having a pair of laterally spaced projecting flanges, said beater unit being provided with a pair of laterally spaced channels arranged to be slidably received by said flanges, means pivotally mounting said support on said standard whereby said beater unit can be swung on said standard to and from a working position, said standard being provided with a channel arranged substantially parallel to the axis of movement of said support and unit, and said unit being provided with a flange arranged to be received in said channel when said unit is moved to its working position to prevent longitudinal movement of said unit from said support.

5. A mixing device comprising a standard, a support on said standard, a motor driven beater unit, means detachably mounting said unit on said support, means pivotally connecting said support to said standard so that said unit can be swung from and returned to a working position, a channel on said standard and a lug on said beater unit received in said channel when said beater unit is moved to said channel when said the lug when received in said channel preventing movement of said beater unit from said support.

6. A mixing device comprising a base, a standard on said base, a motor adapted to be mounted on said standard in a horizontal working position, a gear casing secured to said motor, gearing in said casing driven by said motor, a beater element arranged to be supported by said gear casing substantially at right angles to the horizontal axis of said motor and to be driven by said motor through said gearing, a plate-like support for said motor having a pair of laterally spaced projecting flanges, means pivotally mounting said support on said standard so that said support is supported in a substantially horizontal position on said standard and can be swung upwardly from said position, said motor being provided with a pair of spaced channels arranged to be slidably received by said flanges so that said motor is supported on said standard in its horizontal working position and can be swung upwardly therefrom, the top of said standard being provided with a channel arranged cross-wise thereof and said motor having depending lugs arranged crosswise of the motor and to be received in said channel to prevent sliding movement between said motor and said support.

7. A combination food mixing and juice extracting device comprising a motor, a handle on the top of said motor, a beater element arranged to be driven by said motor in a vertical position beneath said motor, a juice extracting reamer arranged to be disposed above said motor and to be driven thereby, a juice bowl arranged to be placed on the upper side of said motor in cooperative relation with said reamer, and means providing for shifting movement of said handle on said motor to provide space for said bowl and reamer.

8. A combination food mixing and juice extracting device comprising a motor, a handle on the top of said motor, a beater element arranged to be driven by said motor, a juice extracting reamer arranged to be disposed above said motor and to be driven thereby, a juice bowl arranged to be placed on the upper side of said motor in cooperative relation with said reamer, means for retracting said handle from its working position on said motor to provide space for said bowl and reamer, and means for holding said handle in either its working or its retracted position.

9. A combination food mixing and juice extracting device comprising a base, a motor mounted on said base in a horizontal position, a gear casing attached to one end of said motor, a reduction gear device in said casing, a beater element arranged to be driven by said gear device in a vertical position beneath said casing, a vertical driving shaft in said casing driven by said gear device, a juice extracting device arranged to be mounted on the top of said motor and gear casing including a reamer having a driving relation with said driving shaft, a handle on top of said motor and gear casings extending longitudinally thereof substantially through the full length of said motor and gear casings, an interlocking connection between said handle and motor and gear casings providing for relative sliding movement of said handle longitudinally of said motor and casing so that said handle can be retracted from its working position to provide space for said juice extracting device on top of said motor and casing, but preventing relative movement between said members in any other direction, and means for releasably latching said handle both in said working position on said motor and casing, and also in said retracted position.

10. In a mixing device, a power transmission unit having a base and a housing supported on the base, a power transmitting gear mechanism in said housing and a drive shaft for said gear mechanism, a separate power unit for driving said shaft arranged to be mounted on and supported by said housing, a latching device carried by said power unit and a member on said housing engaged by said latching device when said power unit is applied to said housing preventing displacement of said power unit on said housing.

11. In a mixing device, a power transmission unit having a standard, a housing in the upper end of said standard, a cover for said housing, a gear transmission mechanism in said housing, and a vertical drive shaft for said mechanism in said housing having its upper end protruding from said cover, a separate power unit for engaging said end to operate said shaft, a latch carried by said power unit, and an upright stud on said cover provided with a portion arranged to be engaged by said latch when said power unit is applied to said standard so as to secure said unit to said standard.

12. In a mixing device, a power unit having a driving motor and a driving shaft driven by said motor, an agitator having a beating element and a support therefor spaced from the beating element, said power unit being provided with an aperture adapted to receive a portion of said support and spaced from said drive shaft so that when said beating element is connected with said shaft, said portion of said support is received in said aperture, a latch on said power unit arranged to engage said portion in said aperture to hold said agitator to said power unit, a power transmission unit having a standard, a gear transmission mechanism on said standard, a drive shaft for said mechanism adapted to be driven by said driving shaft of said power unit and a stud on said standard spaced from said drive shaft provided with a portion arranged to be inserted in said aperture and engaged by said latch when said power unit is applied to said standard and said drive shaft is connected with said driving shaft so as to secure said power unit to said standard.

13. In a mixing device, a power transmisison unit, a housing for said unit, a standard supporting said housing, a separate motor driven power unit for said transmission unit arranged to be mounted on said housing so as to be supported by said standard and when applied to said housing to have a driving connection with said transmission unit, a locking stud on said housing, a latch on said power unit arranged to be moved into locking relation with said stud to hold said power unit on said housing, and a spring biasing said latch into said locking relation.

ROBERT F. BEAN.

CERTIFICATE OF CORRECTION.

Patent No. 2,103,928. December 28, 1937.

ROBERT F. BEAN.

It is hereby certified that error appears in the printed specificatio of the above numbered patent requiring correction as follows: Page 5, firs column, line 11, claim 5, strike out "channel when said" and insert instea the words and comma working position,; and that the said Letters Patent shou be read with this correction therein that the same may conform to the reco of the case in the Patent Office.

Signed and sealed this 22nd day of February, A. D. 1938.

(Seal)

Henry Van Arsdale,
Acting Commissioner of Patent